United States Patent
Carrea et al.

(10) Patent No.: US 7,363,756 B2
(45) Date of Patent: Apr. 29, 2008

(54) METHOD FOR COMBUSTION OF A FUEL

(75) Inventors: Elisabetta Carrea, Zürich (CH); Peter Jansohn, Küssaberg (DE)

(73) Assignee: ALSTOM Technology Ltd, Baden (CH)

( * ) Notice: Subject to any disclaimer, the term of this patent is extended or adjusted under 35 U.S.C. 154(b) by 164 days.

(21) Appl. No.: 11/150,313

(22) Filed: Jun. 13, 2005

(65) Prior Publication Data
US 2005/0282097 A1 Dec. 22, 2005

Related U.S. Application Data

(63) Continuation of application No. PCT/EP03/50916, filed on Dec. 1, 2003.

(30) Foreign Application Priority Data
Dec. 11, 2002 (DE) ............... 102 57 704

(51) Int. Cl.
F02C 7/08 (2006.01)
F02G 1/00 (2006.01)
F02G 3/00 (2006.01)
(52) U.S. Cl. ........................ 60/39.52; 60/772
(58) Field of Classification Search .............. 60/39.5, 60/752, 39.511, 39.52, 772
See application file for complete search history.

(56) References Cited

U.S. PATENT DOCUMENTS

| 3,621,654 | A | * | 11/1971 | Hull ......................... 60/39.15 |
| 3,969,892 | A | * | 7/1976 | Stettler et al. ........... 60/39.511 |
| 4,356,698 | A | * | 11/1982 | Chamberlain ................ 60/733 |
| 5,154,599 | A | * | 10/1992 | Wunning ..................... 431/215 |
| 5,339,635 | A | * | 8/1994 | Iwai et al. ..................... 60/733 |
| 5,394,688 | A | | 3/1995 | Amos ........................ 60/39.23 |
| 5,412,938 | A | * | 5/1995 | Keller ........................ 60/39.21 |
| 5,644,918 | A | * | 7/1997 | Gulati et al. .................. 60/725 |
| 5,667,376 | A | * | 9/1997 | Robertson et al. .......... 431/115 |

(Continued)

FOREIGN PATENT DOCUMENTS

DE 695 14 672 T2 9/2000

(Continued)

OTHER PUBLICATIONS

J. A. Wünning and J. G. Wünning, "Flameless Oxidation to Reduce Thermal NO-Formation", Prog. Energy Combust. Sci. 23, 81-94 (1997).

(Continued)

*Primary Examiner*—William H. Rodriguez
(74) *Attorney, Agent, or Firm*—Steptoe & Johnson LLP

(57) ABSTRACT

In a method for the combustion of a fuel, a fuel or a premixed combustible mixture is introduced into a combustion space as a combustible fluid open jet. The velocity of the open jet is selected in such a way that it is impossible for a stable flame front to form, i.e. is in any event greater than the flame front velocity, and that, on account of a jet pump effect, flue gas is mixed into the combustible fluid jet from the combustion chamber in a jet-induced recirculation internally within the combustion chamber. The admixed flue gas dilutes and heats the combustible fluid. The heating causes the spontaneous ignition temperature to be exceeded, and a low-pollutant volumetric flame is formed in a highly dilute atmosphere.

37 Claims, 7 Drawing Sheets

U.S. PATENT DOCUMENTS

| | | | |
|---|---|---|---|
| 6,279,323 B1 * | 8/2001 | Monty et al. | 60/752 |
| 6,622,470 B2 * | 9/2003 | Viteri et al. | 60/39.52 |
| 6,910,335 B2 * | 6/2005 | Viteri et al. | 60/786 |
| 2002/0029573 A1 | 3/2002 | Gutmark et al. | 60/722 |
| 2006/0042264 A1 * | 3/2006 | Inoue et al. | 60/776 |

FOREIGN PATENT DOCUMENTS

| | | |
|---|---|---|
| EP | 0 463 218 A1 | 1/1992 |
| EP | 0 687 854 A1 | 12/1995 |
| EP | 0 698 764 A2 | 2/1996 |
| EP | 0 766 045 A1 | 4/1997 |
| EP | 1 156 281 A2 | 11/2001 |
| EP | 1 193 450 A1 | 4/2002 |

OTHER PUBLICATIONS

J. Wünning, "Flammenlose Oxidation von Brennstoff mit hochvorgewärmter Luft" [Flameless oxidation of fuel with highly preheated air], Chemie Ingenieur Technik 63(12), 1243-1245 (1991).

* cited by examiner

METHOD FOR COMBUSTION OF A FUEL

CROSS-REFERENCE TO RELATED APPLICATIONS

This application is a continuation of the U.S. National Stage designation of co-pending International Patent Application PCT/EP03/50916 filed Dec. 1, 2003, which claims priority to German patent application no. 102 57 704.8 filed Dec. 11, 2002, and the entire contents of these applications are expressly incorporated herein by reference thereto.

FIELD OF THE INVENTION

The present invention relates to a method for the combustion of a fuel, in particular in the combustion chamber of a gas turboset. It also relates to an apparatus for carrying out the method.

BACKGROUND OF THE INVENTION

Two inherently contradictory objectives are being pursued when generating energy through combustion of fossil fuels. Firstly, the efficiency which can be achieved is supposed to be lowered in order to save on fuel energy and to reduce the emissions of $CO_2$. Secondly, the lowest possible emissions of pollutants, i.e. in particular NOx and CO, need to be realized.

One possible way of improving the efficiency of a combustion process is based on strong preheating of the combustion air. As a result, the combustion takes place at higher flame temperatures, and the energy of the hot combustion gases is ultimately transferred back to the combustion air in recuperative or regenerative heat exchangers. However, one drawback of the high air preheating temperatures is higher peak temperatures in the flame, which have a disastrous effect on the thermal formation of nitrogen oxides.

Winning and Wunning et al, in "Flammenlose Oxidation von Brennstoff mit hochvorgewärmter Luft" [Flameless oxidation of fuel with highly preheated air], Chemical Ingenieur Tech. 63(12), 1243-1245 (1991), and in "Flameless Oxidation to Reduce Thermal NO-Formation", Prog. Energy Combust. Sci. 23 (1997), have proposed a novel concept for combustion under atmospheric conditions, i.e. in particular at a pressure which is not elevated or is only slightly elevated. In this case, a combustible mixture of fuel and oxidizing agent, in particular air, is brought to temperatures above the spontaneous ignition threshold value. This combustion technique has become known as combustion without the appearance of a flame, mild combustion, colorless combustion or high-temperature combustion. The underlying concept of this new technique consists in the generation of a highly dilute reaction mixture of fuel and oxidizing agent and flue gas, which is held at a temperature above the spontaneous ignition threshold value. Flue gas recirculation on the one hand dilutes the reaction mixture and on the other hand delivers the energy required for preheating to a temperature above the spontaneous ignition threshold value. In this combustion process, the flame front which has hitherto typically occurred in burners is replaced by an invisible volumetric flame which is distributed approximately uniformly through the combustion volume.

One problem with realizing a method of this type is the recirculation of a sufficient quantity of flue gas. Typically, it is necessary to recirculate at least the same volumetric flow of flue gas as the volumetric flow of fresh combustible fluid mixture which is supplied. In particular in the case of gas turbine applications, this involves temperatures of, for example, 1400° C. at the turbine entry. The recirculation is also difficult to implement because burner systems usually have a not inconsiderable pressure loss, so that the total pressure of the flue gas to be recirculated is below that of the fresh gas supplied. Overall, the recirculation of sufficient quantities of flue gas using conventional recirculation techniques is only possible with considerable difficulty, if at all.

SUMMARY OF THE INVENTION

The invention relates to providing a method of the type described in the introduction which avoids the problems of the prior art. In particular, it is intended to provide a method which is such that sufficient quantities of flue gas can be recirculated to increase the temperature at least to the spontaneous ignition point. Furthermore, the intention is for the quantity of flue gas recirculated to be such that the combustible fluid is sufficiently dilute for the formation of nitrogen oxides to remain at a low level. A further demand is for the method to be such that the formation of a stable flame front is avoided, and as far as possible pure volumetric combustion actually occurs. Furthermore, it is intended to provide a suitable apparatus for carrying out the method.

Therefore, the invention involves introducing a combustible fluid, i.e. a fuel or a combustible mixture, directly into the combustion space in the form of a combustible fluid open jet. If the velocity of the open jet is sufficiently great, this jet will entrain flue gas surrounding it in accordance with the jet pump principle. As explained below, the dependency of the mass flow which is recirculated by the jet-induced recirculation internally within the combustion space caused in this way, i.e. the recirculation rate, can be calculated using the law of conservation of momentum. The flow of the open jet can therefore be calculated very easily by the person skilled-in the art on the basis of the criteria given therein. This provides the person skilled in the art with clear teaching, which can be unambiguously and easily reproduced, as to how the flow of the open jet should be set, in particular in order to achieve a defined result. It is in this case assumed, without further explanation, that the flow velocity of the open jet is greater than the flame front velocity of the combustible fluid, which suppresses the formation of a stable flame front. In the simplest possible case, an apparatus for carrying out the method comprises-a front plate of a combustion space, an opening being connected to means for supplying fluid, and a nozzle for generating a combustible fluid open jet which enters the combustion space being arranged in this opening. The entry nozzles are in this case designed as high velocity-nozzles, so that the injection generates a sufficiently high momentum, resulting in the recirculation of the flue gas and the corresponding dilution of the fuel/oxidizing agent mixture, also referred to below as reaction mixture or combustible fluid. The underlying mechanism is based on the conservation of momentum.

The text which follows also refers to an air/fuel ratio of the combustible fluid, but this is in no way intended to imply that the oxidizing agent used necessarily has to be air. Quite on the contrary, it will be readily comprehensible and clear to the person skilled in the art that the indication of an air/fuel ratio can readily be transferred analogously to fuel mixtures with oxidizing agents other than air, for example with pure oxygen, in which context, by way of example, a fuel gas/oxygen mixture with an air/fuel ratio of 1 is to be understood as meaning a stoichiometric mixture, a fuel gas/oxygen mixture with an air/fuel ratio of less than 1 is to be understood as meaning a correspondingly fuel-rich mixture, and a fuel gas/oxygen mixture with an air/fuel ratio of more than 1 is to be understood as meaning a low-fuel mixture. An air/fuel ratio of 2 for a flame using oxygen, just the same as for a mixture using air, means double the quantity of oxygen which is stoichiometrically necessary. The person skilled in the art will readily understand this analogy by applying his scientific knowledge. An air/fuel ratio of $\lambda=0$ means pure fuel, while an air/fuel ratio of "infinite" means pure oxidizing agent. The reciprocal of the air/fuel ratio is the equivalence ratio $\Phi$.

One embodiment of the invention uses an apparatus in which, in one configuration, a central entry nozzle is surrounded by a concentric entry nozzle. In another configuration, the central entry nozzle is surrounded by a plurality of further entry nozzles, preferably of smaller cross section. The further entry nozzles are preferably arranged in a row around the central entry nozzle. Of course, it is also possible to use configurations in which a plurality of rows of smaller entry nozzles are formed. The spacing between the individual peripheral entry nozzles and also the spacing between these entry nozzles and the central entry nozzle are selected in such a way that the jets which are formed during the injection are superimposed on one another after a certain distance. This superimposing of the injected jets to form a combination jet can also be achieved by suitable selection of the injection direction or the divergence of the injection jets. Therefore, it is by no means imperative that the open jets of all the nozzles be oriented parallel; by way of example, they may also cross one another at a real crossing point located downstream or a virtual crossing point located upstream. Furthermore, as an alternative to an individual central entry nozzle, it is also possible to provide a central nozzle configuration, which for its part comprises a plurality of first central entry nozzles, which are arranged within the configuration of second and/or further entry nozzles and are surrounded thereby.

Of course, the first and the second embodiment can also be combined, so that, by way of example, one or more central entry nozzles may be surrounded by a concentric entry nozzle, and this arrangement in turn has a plurality of further entry nozzles arranged in a ring around it. The exit openings of the individual entry nozzles do not necessarily have to lie in one plane. Rather, it is also possible, by way of example, for the exit opening of the central entry nozzle to be located downstream of the injection openings of the remaining entry nozzles, as seen in the direction of injection.

If the present method is used in the burner system of a gas turbine installation, the inlet temperature of a premixed combustible fluid mixture is typically between 400 and 500° C., i.e. below the spontaneous ignition threshold value for a lean mix with, for example, $\lambda=2$. The use of the abovementioned burner system and of the feed of the reactants involved in an open jet with a sufficiently high velocity produces a strong jet-induced recirculation of the flue gas in the combustion space, with part of the flue gas being entrained with the emerging jets, and the reaction mixture being highly diluted as a result. At the same time, jet-induced recirculation internally within the combustion space increases the temperature of the reaction mixture to above the spontaneous ignition threshold value, so that the reaction mixture ignites spontaneously, and on account of the strong dilution combustion takes place with an invisible volumetric flame. This leads to very robust and reliable combustion with a uniform temperature profile and the potential for greatly reduced pollutant emissions. Furthermore, this combustion technique has the potential to interrupt the Rayleigh mechanism, so that pressure pulses, as occur with the lean combustion which has hitherto been used in gas turbine installations, are suppressed. By suitable selection or alteration of injection parameters, the present method allows a gas turbine installation to operate stably over a wide load range. Tests have shown that in gas turbine installations, at the high-pressure conditions prevailing therein-together with low-fuel conditions, for example $\lambda=2$, even a flue gas recirculation rate in the region of 100% is sufficient to generate the flameless combustion mode. The recirculation rate $K_V$ is in this context defined as the ratio between the mass flow of the recirculated flue gas and the mass flow of the fresh combustible fluid fed to the combustion chamber:

$$K_V = \frac{G_{IR} + G_{ER}}{F + Ox}$$

in which:

$G_{IR}$ denotes the mass flow of the internally recirculated flue gas, $G_{ER}$ denotes the mass flow of the externally recirculated flue gas, F denotes the mass flow of the flue, and Ox denotes the mass flow of the oxidizing agent, usually air.

In a preferred embodiment of the invention, which is particularly simple to realize in design terms, $G_{ER}<G_{IR}$, and in particular $G_{ER}=0$.

High flue gas recirculation rates cause a not inconsiderable increase in the levels of $H_2O$ in the combustion system; Similarly to the injection of water or steam into a combustion system, this increase has an additional positive influence on suppressing the formation of NOx, since the result is the formation of a heat sink, keeping the process temperature controllable. Furthermore, the dissociation of $H_2O$ in the hot reaction zone is likely to lead to a higher level of OH radicals, which therefore increases the destruction of $N_2O$.

Reaction kinetics model calculations for typical operating conditions in gas turbine installations demonstrate the behavior of the flameless combustion process used here under conditions of this type. It has been found that the delay times for spontaneous ignition at a high adiabatic flue gas recirculation rate lie within the ranges which are typically required for gas turbine installations. FIG. 1 shows, by way of example, a diagram as the result of a calculation for different operating pressures and recirculation rates. Furthermore, it has been possible to demonstrate that the burnout times do not depend on the degree of dilution of the reaction mixture, since a sufficiently high flame temperature is reached.

The reduction in the formation of NOx which can be achieved when using the present method, in particular at a high pressure, of which the combustion takes place with a high flue gas recirculation rate of 300%, is illustrated in FIG. 2 in comparison with a swirl-stabilized lean premix combustion known from the prior art. The figure plots the nitrogen oxide emissions, based on 15% residual oxygen in the dry flue gas. The advantages of the flameless combustion mode, line B, compared to conventional premix combustion, line A, are immediately apparent.

It has been found that the flue gas recirculation rate rises as a result of jet-induced internal flue gas recirculation according to the invention, with a reduced thermal power of the firing device, which is generally associated with further mix depletion. The result of this is that the spontaneous ignition is maintained even under these lower-fuel conditions imposed by operation. FIG. 3 shows the way in which the recirculation rate is dependent on the relative power conversion $P/P_{MAX}$ when the reaction mixture is injected without swirl, swirl number S=0, and with swirl, swirl number S=0.5. The flue gas recirculation rate can be calculated using the law of conservation of momentum in accordance with the following formula:

$$\frac{M}{M_0} = \frac{u_0}{u} = \sqrt{\frac{\rho}{\rho_0}} \cdot \frac{A}{A_0} = (1+K_V)$$

For circular nozzle jets, this equation can be written as follows:

for $x/d_0 < 8$:

$$K_V(\%) = \left[0.083 * \frac{x}{d_0} + 0.0128 * \left(\frac{x}{d_0}\right)^2\right] \cdot \frac{\rho}{\rho_0}$$

for $x/d_0 > 8$:

$$K_v(\%) = 0.32 * \frac{x}{d_0} * \sqrt{\frac{\rho}{\rho_0}}$$

in which:
M denotes the total mass flow;
$M_0$ denotes the mass flow through the nozzle;
u denotes the mean axial velocity;
$u_0$ denotes the mean axial velocity at the nozzle exit;
$\rho$ denotes the gas density of the flue gas;
$\rho_0$ denotes the gas density at the nozzle exit;
A denotes the jet cross section;
$A_0$ denotes the nozzle cross section;
x denotes the axial distance from the nozzle exit; and
$d_0$ denotes the nozzle diameter.

In the case of a free jet with swirl, the recirculation rate and the rate at which the velocity drops increase in accordance with the following correlation $$K_v = \left(0.32 \cdot \frac{x}{d_0} + K \cdot S\right) \cdot \sqrt{\frac{\rho}{\rho_0}}$$

in which
S denotes the swirl number and
K represents an empirically determined constant.

It has been found that the recirculation rate is a function of the distance from the nozzle exit. Therefore, for a given geometry, the flue gas content in the reacting combustible fluid can be influenced by the position of the spontaneous ignition. On the other hand, of course, the recirculation rate also has a direct influence on the temperature of the mixture which is formed. The following text gives method variants with which, under inherently constant flow conditions, the location of the spontaneous ignition and therefore the recirculation rate of the combustion are made variable.

With the present method and the associated burner, it is possible, in part in combination with the particular embodiments, to completely exhaust the chemical kinetic potential of the flameless combustion for a gas turbine installation. This relates in particular to achieving high recirculation rates at low pressure losses, a high degree of mixing upstream of the combustion, reliable combustion, a high flame stability, low emissions and low combustion oscillations. The method according to the invention can be realized very successfully in a gas turbine installation with a recirculation rate $K_V$ of $100\% < K_V < 200\%$. It is preferable for the method to be operated with a recirculation rate of $100\% < K_V < 150\%$. It is preferable for the majority, and very particularly preferably all, of the flue gas to be admixed to the combustible fluid open jet by the jet-induced recirculation internally within the combustion space which has been described above. This means that there is no need for complex structural means for external recirculation of flue gas in an apparatus for carrying out the method.

In one configuration of the present method and of the associated burner, a swirl component is imparted to the jets emerging from the entry nozzles. A weak swirl component with a swirl number S less than 0.5 leads to an increased recirculation of flue gas without the formation of a local recirculation zone. The swirl can in this case be generated by corresponding mechanical swirl generators in the entry nozzles or their feeds. If a greater swirl component with a swirl number of more than 0.5 is generated, the recirculation rate rises again, but in this case a local recirculation zone is formed, leading to what is known as vortex breakdown and the formation of a swirl-stabilized flame with a stable flame front, as is known from swirl-stabilized gas turbine premix burner systems. According to the invention, this is undesirable in the nominal operating state. Therefore, the generation of a swirl more than 0.5 is preferably used if flameless operation is not possible on account of particular operating conditions. One example would be the starting of a burner according to the invention, when hot flue gas for recirculation and increasing the temperature to the spontaneous ignition temperature is not yet available. This then requires a variable swirl generator, which can generate different swirl. components in the open jet depending on the setting and incoming flow. In normal operation, this swirl generator is then used to generate a swirl less than S=0.5, preferably of S<0.4. The swirl is increased under conditions which would lead to extinguishing of the flameless combustion, so that a swirl-stabilized flame is formed. In this case, it is possible for all the combustible fluid open jets or only some of them to be swirled up. In a further preferred embodiment, the open jets of adjacent nozzles are swirled up in opposite directions.

It is preferable for a premixed fuel/oxidizing agent mixture to be fed to the entry nozzles as combustible-fluid. In a preferred embodiment of the invention, combustible fluid with different air/fuel ratios is fed to different nozzles. It is preferable for combustible fluid with different air/fuel ratios to be supplied to different nozzles, in particular at least one central nozzle and at least one nozzle surrounding the central region formed in this way. The background to this is as follows: as can be seen above, under defined incoming flow conditions, the recirculation rate is a function of the distance from the nozzle exit. Therefore, by influencing the location of spontaneous ignition, which under otherwise constant conditions can in turn be done by means of the air/fuel ratio, it is possible to influence the quantity of recirculated flue gas at the location of ignition, even if the average air/fuel ratio remains constant across a burner, as described below: in a first variant, a fuel-rich mixture with an air/fuel ratio which is lower than the total burner air/fuel ratio and at any rate preferably below 1, is introduced in a central region. This mixture is relatively readily ignitable. A sheath of a low-fuel mixture with an air/fuel ratio of more than 1, which is less readily ignitable, is positioned around this central region through further nozzles or one substantially concentric annular nozzle. The mixing and increase in temperature then takes place first of all in the low-fuel region, while the readily ignitable fuel-rich region is insulated from this. Consequently, the location of ignition is shifted further downstream than would be the case with a homogeneous overall mixture with an average air/fuel ratio. Consequently, the ignition only takes place when a large amount of fuel gas has already been admixed to the combustible fluid. This results, inter alia, in lower combustion peak temperatures. An operating mode of this type is particularly suitable for operation at high and ultra-high heat conversion rates and high inflow temperatures of the combustible fluid, as is the case, for example, during full-load operation of a gas turboset. In a further method variant, the outer region is operated with a relatively fuel-rich mixture, the air/fuel ratio of which is less than the average air/fuel ratio and preferably less than 1. To compensate, the central region is supplied with low-fuel mixture or pure oxidizing agent. Consequently, hot flue gas is directly admixed to the readily ignitable mixture, and the ignition takes place further upstream than would be the case with a mixture with a burner-average air/fuel ratio. An operating mode of this type is highly advantageous, for example, during ignition and at low burner-average air/fuel ratios, correspondingly low flame temperatures and low temperatures of the flue gas, since the ignition of the volumetric flame is boosted. This enhances the stability of combustion. In a further method variant, the central region is operated with low-fuel mixture, for example with an air/fuel ratio of two, while the surrounding region is operated with pure oxidizing agent or a mixture with a very high air/fuel ratio, for example of 5 or above. This mixture per se is inherently no longer ignitable. In this way, a stoichiometry gradient allowing the location of ignition to be adjusted is produced in overall low-fuel operation. This is explained below in conjunction with an exemplary embodiment of the invention. A further possible way of influencing the underlying process is for the mass flow to individual nozzles or groups of nozzles to be varied, allowing the exit momentum to be set; by way of example, it is also conceivable, if one or more central nozzles is surrounded by a plurality of outer nozzles, for the supply of combustible fluid to some of these nozzles to be selectively shut off, in order to vary the entry momentum of the fluid open jets with the same group mass flow. Therefore, an apparatus for carrying out the method preferably in each case has separate fluid feeds to: one or more central first entry nozzles; if appropriate a second nozzle concentrically surrounding the first nozzle or nozzles; if appropriate a plurality of further entry nozzles arranged substantially concentrically around the central configuration. In a preferred embodiment, each fluid feed is assigned a mixing apparatus for mixing fuel and oxidizing agent to form in each case a homogeneous combustible fluid. In this way, the air/fuel ratio of the combustible fluid fed to the central configuration and if appropriate of the surrounding nozzles can be set independently of one another. In a further embodiment, an actuator, which can be used to set the respective mass flow independently, is arranged in each of the combustible fluid feeds. Furthermore, throttling or shut-off members may be arranged in the feed lines to individual nozzles, in such a manner that the latter can be selectively shut off; as a result, a defined mass flow of fluid can be distributed between different nozzles, so that the momentum of the fluid open jets and therefore the recirculation rate can be varied.

The choice of geometric arrangement and configuration of the individual entry nozzles of the present burner system and of the mode of operation in accordance with the variant embodiments explained above or presented in the exemplary embodiments is in each case selected as a function of the geometry of the combustion chamber and the required residence time in the combustion chamber, in order to achieve complete combustion over the widest possible operating or load range. Significant objectives in this context are to widen the flame volume and to minimize the residence time as well as the risk of pressure pulses.

In one operating mode of the method, the supply of fluid to the nozzles is pulsed. This likewise allows the mixing of combustible fluid and flue gas to be influenced. If a plurality of jets which are not pulsed in phase are used, improved mixing with a reduced risk of pressure pulses in combustion is achieved. This effect is likewise achieved with a cyclical, intermittent or oscillating supply of combustible fluid.

According to the invention, therefore, a method of the type described in the introduction, on account of the use of the jet-induced flue gas recirculation internally within the combustion space, can be operated without flue-gas recirculation apparatus of complex design, and allows extremely flexible adaptation to a wide operating range.

BRIEF DESCRIPTION OF THE DRAWINGS

The method according to the invention and an apparatus which is particularly suitable for carrying this out are explained below on the basis of exemplary embodiments in conjunction with the drawing, in which.

DETAILED DESCRIPTION OF THE PREFERRED EMBODIMENTS

Figure 4:
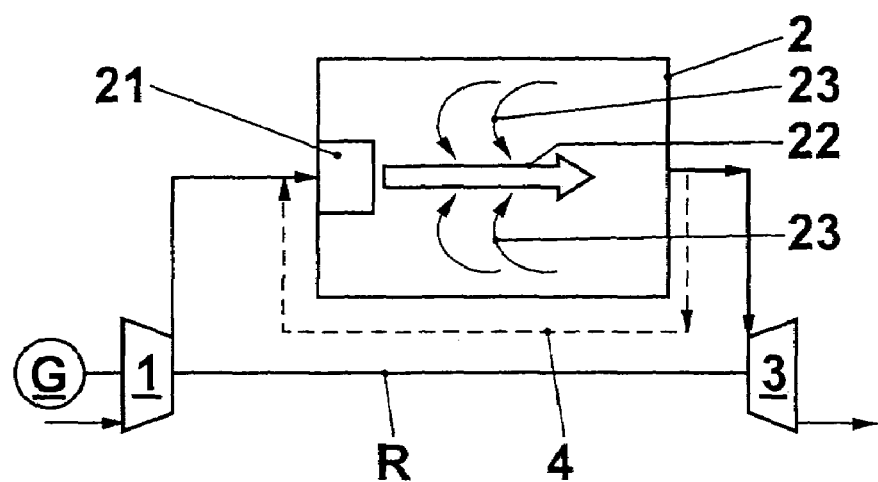
FIG. 4 shows a diagrammatic gas turboset with a burner system with flue gas recirculation in accordance with the present invention.

FIG. 4 diagrammatically depicts a gas turboset. A generator G, a compressor 1 and a turbine 3 are arranged on a common shaft R. The compressor 1 compresses ambient air and delivers it into a combustion chamber 2, where a fuel is burnt in the air. The hot and confined flue gases formed drive the turbine 3. The turbine 3 in turn drives the compressor 1 and the generator G. The combustion in the combustion chamber 2 is intended to take place as spontaneously igniting volumetric combustion of the type described above. The increase in the temperature of a fuel/air mixture provided in the burner 21 to the spontaneous ignition temperature is intended to be effected by admixing hot flue gas which has been recirculated from the combustion chamber. One possible way of doing this is external flue gas recirculation along the path marked by 4. As explained above, this cannot generally be realized without problems. According to the invention, therefore, the flue gas is admixed with the combustible fluid via jet-induced recirculation internally within the combustion space. For this purpose, the burner 21 is designed in a such a way that a combustible fluid open jet 22 flows into the combustion space 2 at a high velocity, where it entrains flue gas 23 fundamentally in accordance with the jet pump principle.

Figure 5:
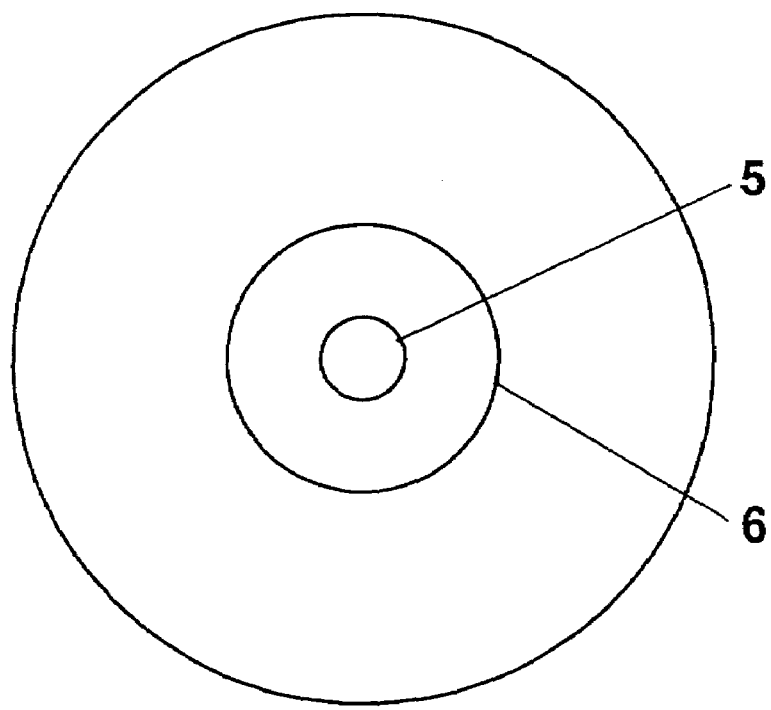
FIG. 5 shows a first exemplary arrangement of entry nozzles.
Figure 6:
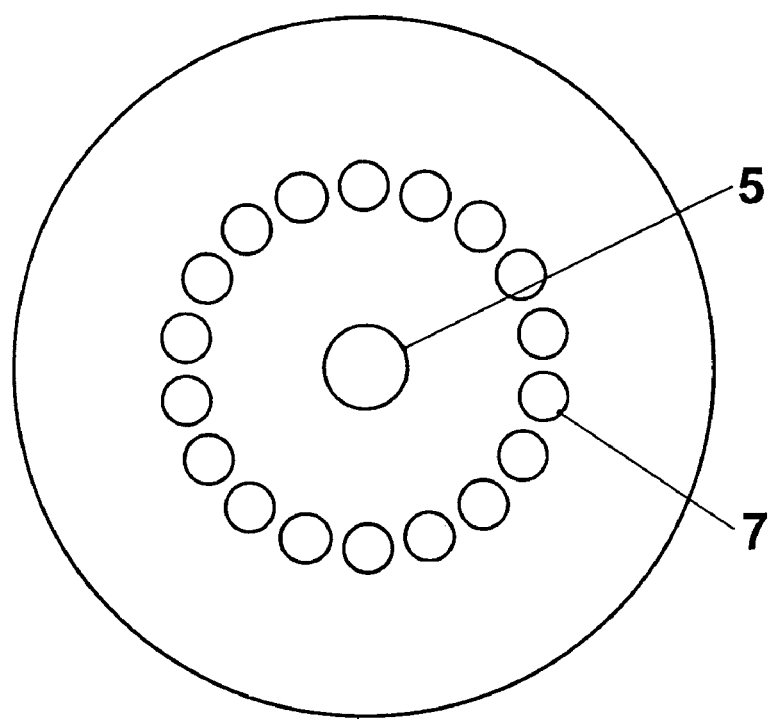
FIG. 6 shows a second exemplary arrangement of entry nozzles.

FIGS. 5 and 6 show two configurations of a nozzle arrangement of an apparatus which is suitable for carrying out the method. In the configuration shown in FIG. 5, a central nozzle 5 is surrounded by a concentric nozzle 6. It is preferably possible for combustible fluid to be fed to the two independently of one another. FIG. 6 shows a configuration in which the central nozzle 5 is surrounded by a series of smaller nozzles 7. Of course, it is additionally possible for nozzles 7 to be used in an arrangement as shown in FIG. 5. The jets of the respective surrounding nozzles mix with the centrally emerging jet after a certain distance. The exit momentum of the jets, which emerge at a high velocity, brings about strong recirculation of flue gas in the combustion space, which is entrained by the emerging jets and in this way highly dilutes the reaction mixture. With both the entry nozzle configurations illustrated, it must be ensured that the required degree of dilution is achieved before the spontaneous ignition takes place, in order to avoid the formation of strongly localized hot spots. Undesirable ignition may in this case take place at an interface between the fuel and the oxidizing agent under stoichiometric or fuel-rich conditions if the mixing with the recirculated flue gas is not strong or deep enough to dilute the stoichiometric interfaces. The formation of hot spots, as they are known, in turn has a highly negative effect on the emissions of NOx. Therefore, in a preferred embodiment of the method, a premixed fuel-rich fuel/air mixture with an air/fuel ratio of $\lambda<1$ is supplied via the central nozzle 5, while in the configuration shown in FIG. 5 pure air or a low-fuel mixture with $\lambda \gg 1$, in particular $\lambda>3$, is supplied via the nozzles 6 or 7. In an operating mode of this type, the outer, coaxial jet does not cause premature spontaneous ignition during mixing with the recirculated flue gas, since the lean stoichiometry of this jet does not allow this spontaneous ignition prior to mixing with the central jet. In this operating mode, it is possible to achieve better process control, with the risk of hot spots forming and of local superheating being reduced. In a further embodiment of the invention, the nozzle configuration shown in FIGS. 5 and 6 supplies a low-fuel mixture with $\lambda \gg 1$ of a fuel/air mixture via the central nozzle 5 and a fuel-rich mixture with $\lambda<1$ through the nozzles 6 or 7. In this case, faster spontaneous ignition is to be expected, since richer mixtures ignite more quickly than lean mixtures. The outer jet comprising the rich mixture in this case entrains the surrounding flue gas, and as a result is quickly heated and ignited more readily than a lean mixture. Consequently, an operating mode of this type is recommended for starting up the burner, since the outer annular jet facilitates ignition.

Figure 15:
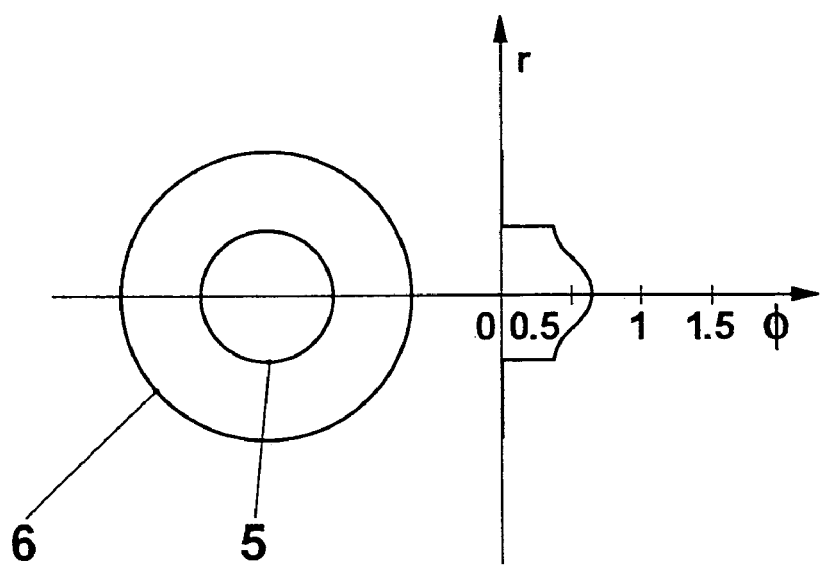
FIG. 15 shows a concentration profile for a fuel/oxidizing agent mixture within the combustion chamber assuming a defined operating mode according to the invention.
Figure 16:
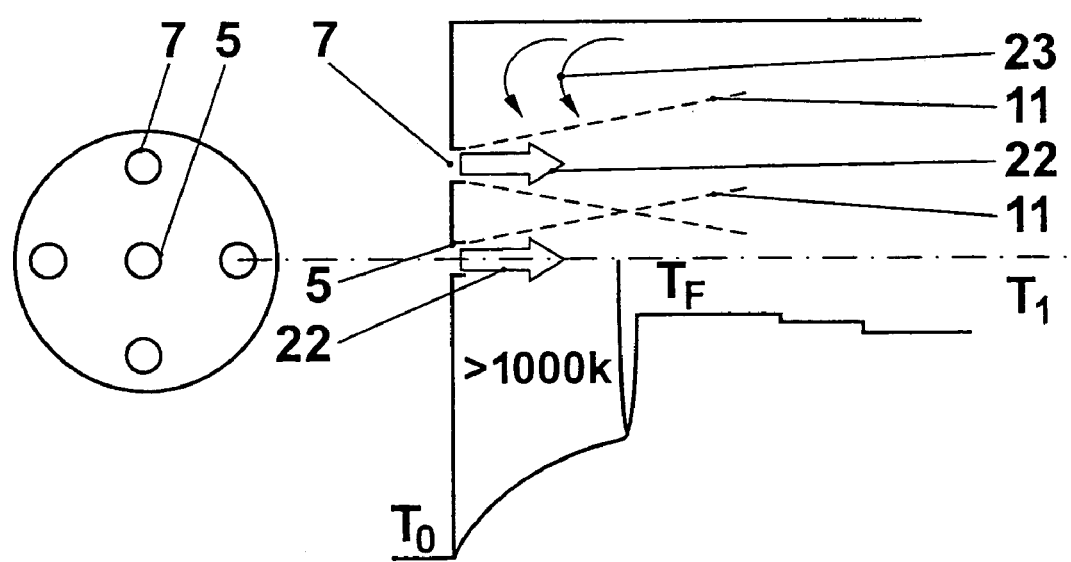
FIG. 16 shows an example of a temperature profile over the longitudinal extent of a combustion chamber operated in accordance with the invention.

In a further configuration of the present method, a low-fuel fuel/air mixture with, for example, $\lambda=2$ is supplied via the central entry nozzle 5, while pure air or extremely dilute mixture is injected via the surrounding nozzles 6 and 7, in order to entrain the surrounding flue gas. The sheathing flow in this case simultaneously serves to control the ignition, since it forms a barrier to the ignitable mixture which is present in the inner jet. In an operating mode of this type, a combustible fluid open jet with a concentration which varies over the cross section of the jet is established; the fuel concentration is lower at the edge than in the center, with the result that the outer regions delay the spontaneous ignition, and therefore a higher recirculation rate of the flue gas can be achieved by the location of spontaneous ignition. The concentration profile must in this case have a leaner stoichiometry at the edge than the mean stoichiometry of the jet as a whole. In this way, the component with the leaner mixture is mixed with the flue gas over a greater length of the free jet, since a higher energy is required for ignition than for the mean stoichiometry. With an operating method of this type, therefore, the ignition instant can be shifted, and consequently the recirculation rate and the degree of dilution can be controlled. The concentration profile can in this case be altered as a function of the load, in such a way that optimum combustion can be achieved at any load throughout the entire combustion process. FIG. 15 shows an example of a concentration profile over the cross section of the combustible fluid jet. The central nozzle 5 and the concentric nozzle 6 are illustrated in the left-hand part of the figure, while the concentration profile in the form of the equivalence ratio $\Phi=1/\lambda$ is illustrated in the right-hand part of the figure; pure air or an inert gas is supplied via the surrounding nozzle 6 as a shielding flow. The reciprocal of the air/fuel ratio, rather than the air/fuel ratio itself, is plotted in this illustration, to make the illustration clearer and to keep the range of values to be illustrated finite. The shielding flow can also be introduced via a plurality of nozzles 7. FIG. 16 shows a typical temperature profile as a function of the distance from the nozzle exit in an operating mode of this type. The fluid open jets 22 flow into the combustion space at temperature $T_0$ through nozzles 5 and 7. These open jets entrain flue gas 23, which dilutes and heats the reaction mixture. The dashed lines diagrammatically indicate the jet profile of the open jets 22 which emerge from the nozzles 5 and 7. The flue gas recirculation and the entraining of the flue gas are predominantly effected by the outer jets of the nozzles 7, so that it is predominantly these jets which are heated by the flue gas. Spontaneous ignition of the reaction mixture takes place at the point at which the heated air of the outer jets meets the jet of the fuel/air mixture supplied via the central nozzle 5, leading to a strong increase in temperature to the flame temperature $T_F$. The reaction mixture then burns in a highly dilute environment and, as a result of further mixing with flue gas, is cooled back down to a temperature $T_1$ by the time it emerges from the combustion chamber.

In the case of an embodiment with individual surrounding jets, for example in accordance with FIG. 6, the influence of the outer jets on the recirculation rate is lower than the sum of the influence of each individual jet on the recirculation rate would lead one to expect. This is because beyond a certain distance from the nozzle exit, the jets mix with one another to form an overall jet and as a result lose their individual jet characteristics. With an arrangement of this type, it is possible to achieve a recirculation rate of 130% before the outer jets come into contact with the central jet. It has been found that in a high-pressure system, as is generally present in gas turbine applications, a recirculation rate of 100% is sufficient to ensure reliable spontaneous ignition of a volumetric flame. Under these conditions, optimum results can be achieved with a recirculation rate $K_V$ of 100%<$K_V$<200%, preferably with 100%<$K_V$<150%. To increase the recirculation rate in an arrangement of this type to above the abovementioned 130%, it is preferable to use an apparatus with additional swirl generators 8, as explained below in connection with FIGS. 7 and 8. In this case, a swirl can be imparted to the outer jets, which can lead to both oppositely directed and identically directed swirl components in adjacent jets. This additional swirl generation produces a higher degree of dilution and improved mixing between the fresh reaction mixture supplied and the flue gas prior to the instant of ignition and therefore better process control and improved operation.

Figure 1:
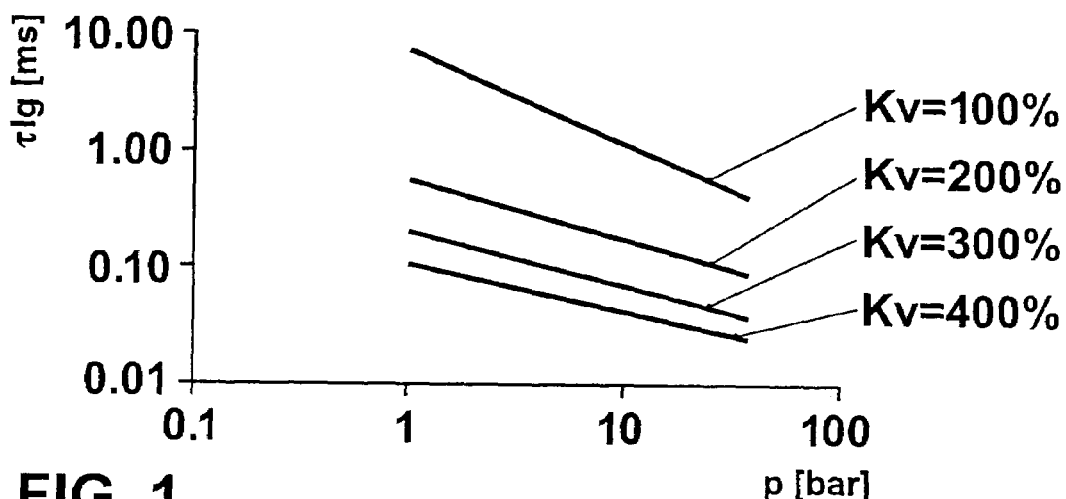
FIGS. 1 and 2 show calculated delay times for spontaneous ignition and NOx emissions at different operating pressures and recirculation rates, assuming an adiabatic flame temperature of 1800 K.
Figure 2:
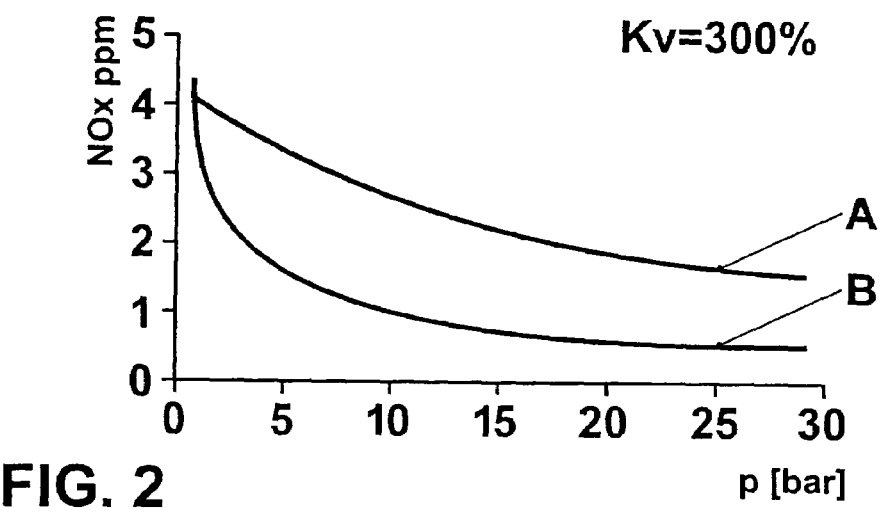
Figure 3:
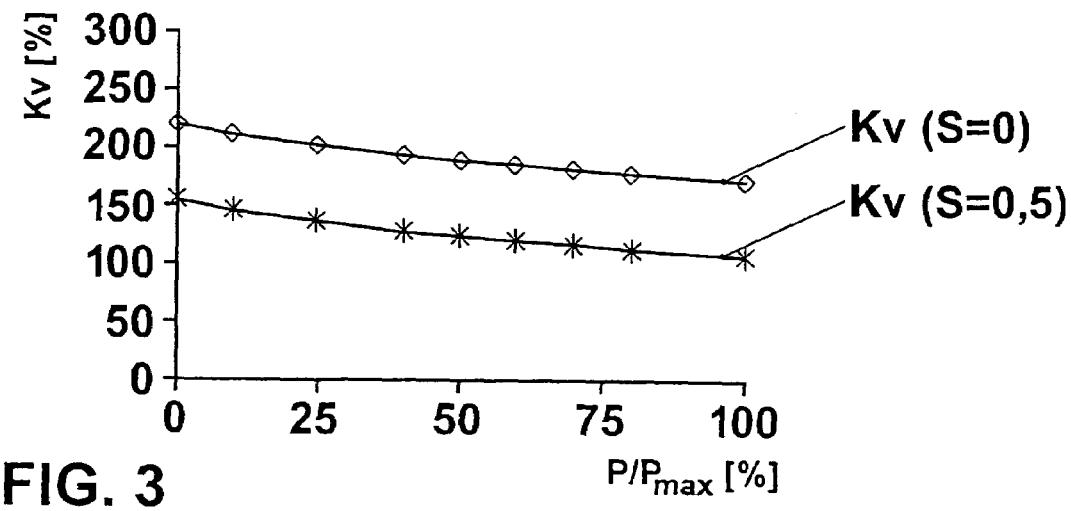
FIG. 3 shows calculated flue gas recirculation rates as a function of the relative burner load with and without additional swirl generation.
Figure 7:
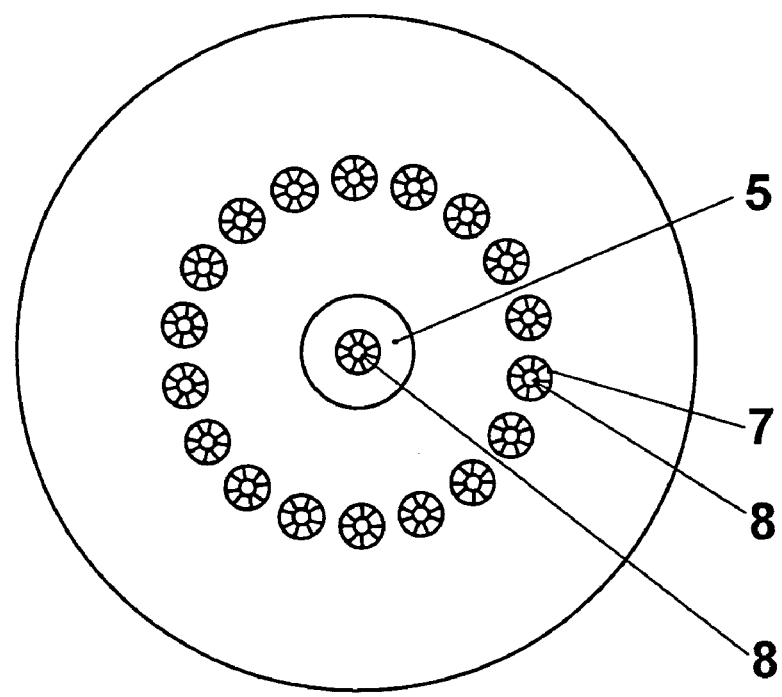
FIG. 7 shows a third exemplary arrangement of entry nozzles.
Figure 8:
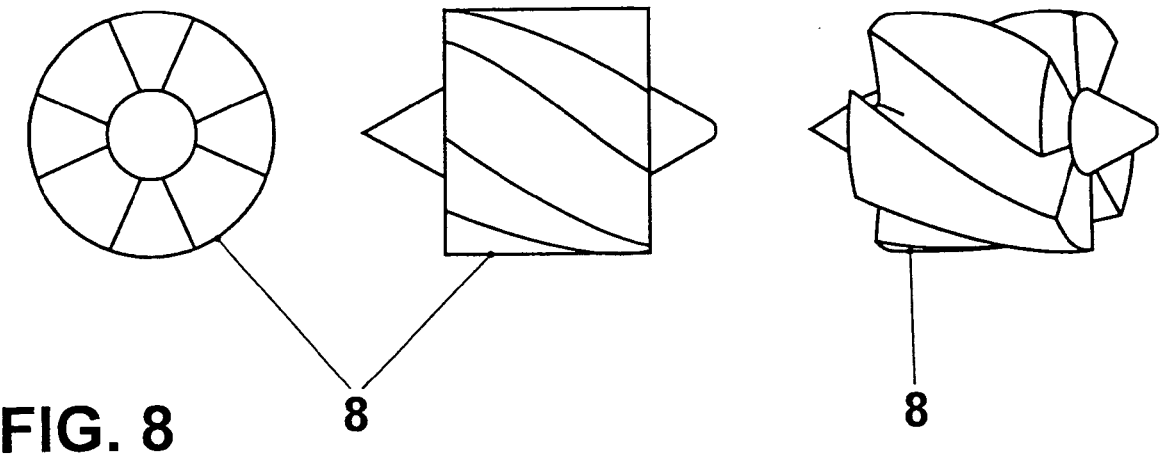
FIG. 8 shows an example of a swirl generator for use in the entry nozzles of an apparatus according to the invention.

FIG. 7 shows a further example of a nozzle configuration for use in an apparatus for carrying out a method according to the invention. Swirl generators 8 are arranged within the entry nozzles 5 and 7 for injecting the air or the fuel/air mixture into the combustion chamber with a swirl. An example of a suitable swirl generator is illustrated in three different perspectives in FIG. 8. In addition to the use of a helical swirl generator of this type, it is, of course, also possible to employ other known systems, such as for example metal guide plates, to generate the swirl. Both the central nozzle 5 and the coaxial nozzle 6 or the surrounding nozzles 7 can be provided with swirl generators. Of course, it is also possible for just one of the nozzles or groups of nozzles to be equipped with a swirl generator. The use of the swirl generator increases the recirculation rate and makes mixing more intensive, as has already been explained in connection with FIG. 3. Furthermore, the degree of mixing between two adjacent jets can be improved by an oppositely directed swirl being applied to the two jets. The swirl leads to a wider jet exit angle, with a greater velocity drop, and therefore improves the entraining of the surrounding flue gas in the individual jets. The swirl number which is imparted is preferably selected to be less than S=0.5, preferably less than S=0.4, in order to allow the present flameless combustion mode. A swirl number of over S=0.5 or 0.6 would lead to a vortex breakdown, i.e. to a swirl-induced backflow zone, such that a swirl-stabilized visible flame known from gas turbine premix burners would form. Therefore, in a preferred configuration, movable block-like swirl generators with a variable swirl are used. In this operating mode, these swirl generators are set to generate a swirl with S<0.5, preferably with S<0.4. If flameless burner operation is not possible, on account of disruption or significantly altered operating conditions, for example if insufficient hot flue gas or an insufficient temperature of the flue gas is available, the swirl generators are adjusted so as to increase the swirl to S>0.5, or S>0.6, so that a visible flame is established, acting, as it were, as a pilot flame.

Figure 9:
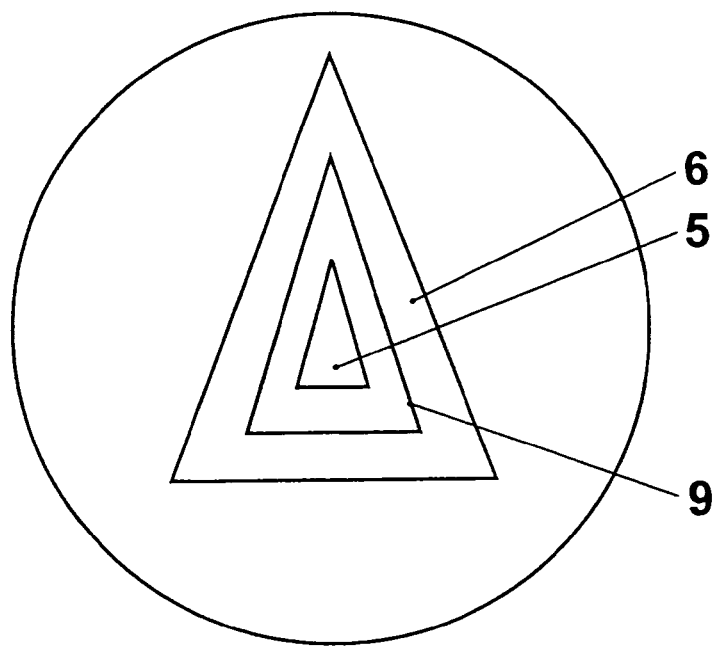
FIGS. 9 to 12 and 14 show further exemplary arrangements of entry nozzles.
Figure 10:
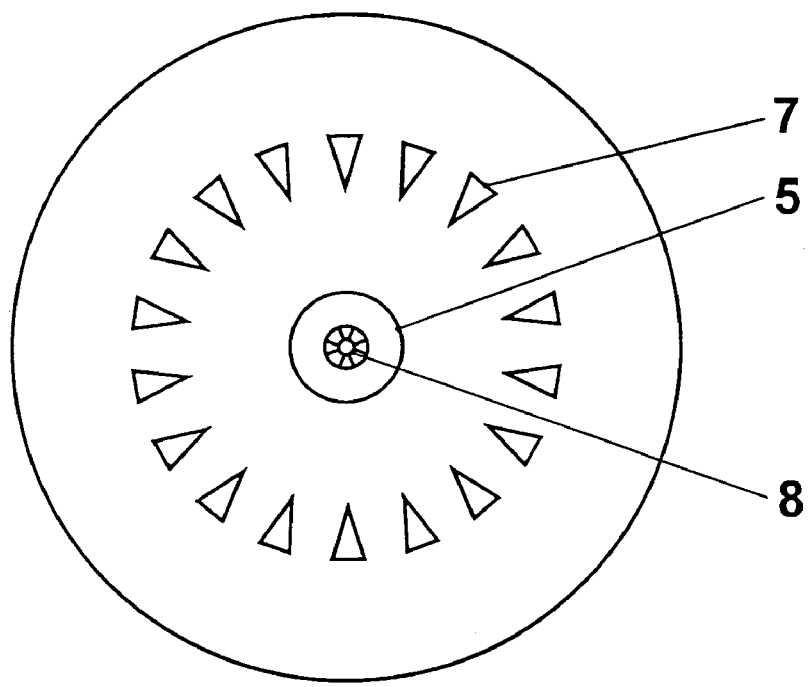
Figure 11:
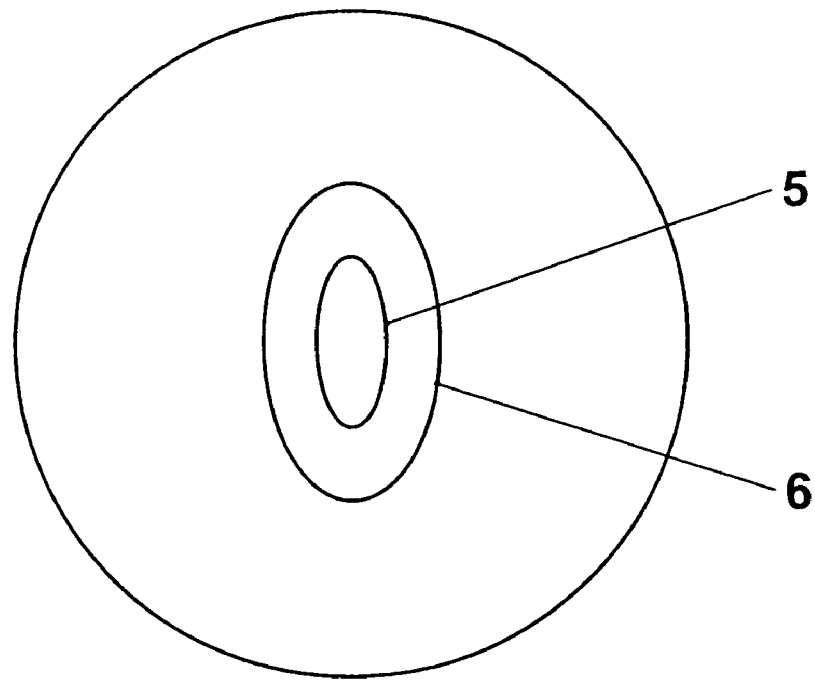
Figure 12:
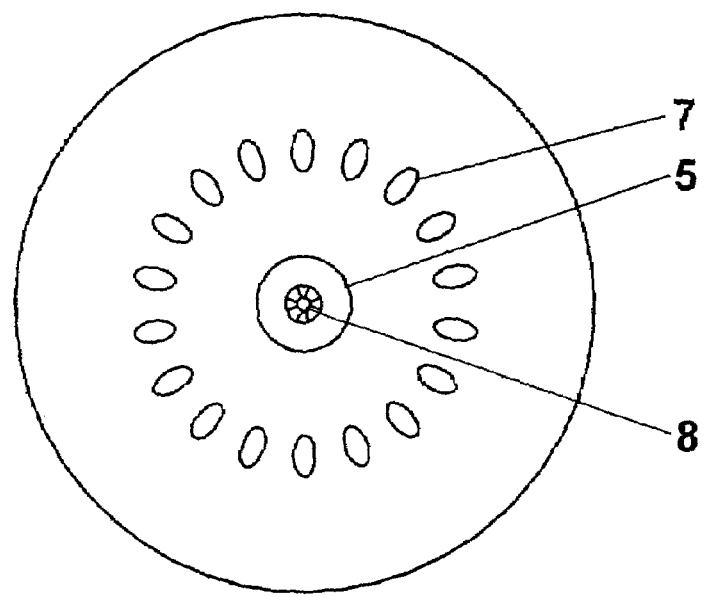

As well as circular nozzle openings, it is, of course, also possible to use other geometric shapes of the nozzle openings, which lead to corresponding non-circular jet cross sections. Selecting a different geometry for the nozzle openings in this way, as illustrated, by way of example, in FIGS. 9 to 12, allows the mass flows and the combustion to be controlled better depending on the specific conditions. The use of non-circular jets can in this case lead to improved large-scale or small-scale mixing and can improve combustion, for example by improving the efficiency of combustion, reducing combustion instabilities and undesirable emissions. Jets which are not circular in cross section have significantly greater recirculation rates than circular jets, on account of vortex self-induction effects. FIGS. 9 and 10 specifically illustrate a configuration with nozzle openings which have a triangular geometry. In the configuration shown in FIG. 9, the outer nozzle 6 may directly adjoin the inner nozzle 5 or may be separated from the latter via a spacer piece 9. The connection may also be interrupted. The direction of these triangular nozzles can likewise be varied, in order to achieve the optimum configuration under the given conditions for the flow control and the flue gas recirculation. In this case too, it is possible both to supply pure fuel via the central nozzle 5 or to supply partially or fully premixed fuel, as has already been explained for the other embodiments. FIGS. 11 and 12 show another possible embodiment, in which at least some of the nozzles have an elliptical geometry. Of course, it is also possible to use other nozzle geometries, such as for example rectangular nozzles.

Figure 13:
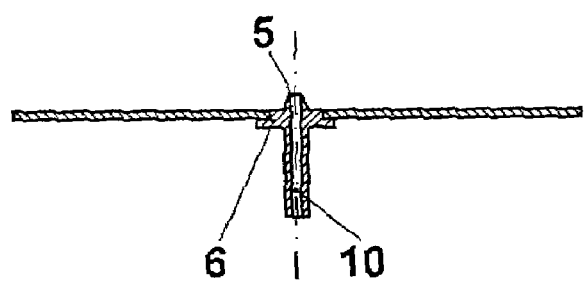
FIG. 13 shows a side view of an apparatus according to the invention.

Finally, FIG. 13 shows, by way of example, a configuration in which the nozzle exit openings do not lie in one plane. In this example, the central nozzle 5, which is illustrated here together with a fuel feed 10, is formed downstream of the surrounding nozzle opening 6. A configuration of this type could be used to shift the point at which the two nozzle jets are superimposed on one another further into the combustion chamber, in order to achieve a higher degree of mixing with the flue gas on account of the later ignition.

Figure 14:
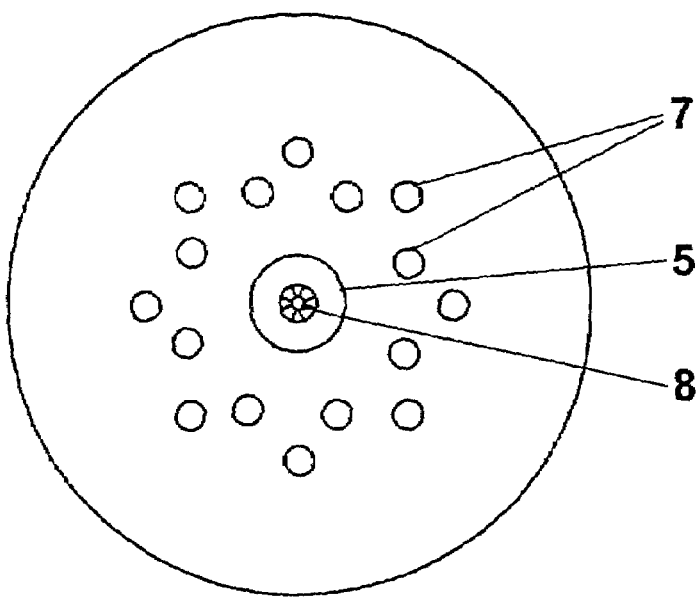

In addition to the outer nozzles 7 being arranged on a circular-line, it is also possible to provide a plurality of rows of outer nozzles. This is illustrated by way of example in FIG. 14. An arrangement with more than one or two rows of nozzles is also possible. An irregular arrangement of the outer nozzles 7 may also be considered, in order to interfere with the symmetry of the system and therefore to suppress self-induced pulses. Selecting an irregular stoichiometry for the mixtures supplied via the individual outer nozzles 7, so that some are leaner or richer than others, may also be considered.

Furthermore, it is possible for some or all of the jets supplied to be injected in pulsed form, for example through use of a resonance tube. A plurality of burners are used in a combustion chamber of a gas turbine installation as a function of the demand for energy. One of the known problems in gas turbine installations is that of combustion pressure fluctuations, which are caused by thermoacoustic oscillations and lead to high mechanical loads on the installation. Pulsed injection allows oscillations of this type to be reduced or suppressed. The pulsating jets-can also be used to improve the recirculation rate and to control combustion instabilities which arise in conjunction with pressure pulses. In one configuration, individual jets may be injected out of phase into the combustion space, in order to disrupt the known Rayleigh mechanism and as a result to suppress self-induced combustion pulses in the system.

LIST OF DESIGNATIONS 1 compressor
2 combustion space
3 turbine
4 external flue gas recirculation
5 central first entry nozzle
6 concentric second entry nozzle
7 outer entry nozzles
8 swirl generator
9 spacer piece 10 fuel feed
11 jet profile
21 burner
22 open jet, combustible fluid open jet
23 recirculated flue gas
R shaft, rotor
G generator

What is claimed is:

1. A method for combustion of a fuel, in particular in a combustion chamber of a gas turboset, comprising:
   introducing a combustible fluid into a combustion space through at least one entry nozzle to form a combustible fluid open jet, the combustible fluid selected from the group consisting of a fuel and a combustible mixture;
   admixing recirculated flue gas from the combustion space to the combustible fluid open jet in order to dilute the open jet and increase temperature of the open jet;
   wherein the increase in temperature is such that the combustible fluid which has been diluted is brought to a temperature which leads to spontaneous ignition thereof; and
   wherein flow of the combustible fluid open jet has a flow velocity greater than a flame front velocity of the combustible fluid, such that formation of a stable flame front is avoided and the combustible fluid open jet will entrain flue gas surrounding the combustible fluid open jet in accordance with the jet pump principle, whereby at least part of the flue gas is admixed into the combustible fluid open jet through jet-induced recirculation internally within the combustion space.

2. The method of claim 1, wherein at least a majority of the flue gas which is admixed with the combustible fluid is admixed with the combustible fluid open jet through the jet-induced recirculation internally within the combustion space.

3. The method of claim 1, wherein substantially all the flue gas which is admixed to the combustible fluid is admixed to the combustible fluid open jet through the jet-induced recirculation internally within the combustion space.

4. A method for combustion of a fuel, in particular in a combustion chamber of a gas turboset, comprising:
   introducing a combustible fluid into a combustion space through at least one entry nozzle to form a combustible fluid open jet, the combustible fluid selected from the group consisting of a fuel and a combustible mixture;
   admixing recirculated flue gas from the combustion space to the combustible fluid open jet in order to dilute the open jet and increase temperature of the open jet;
   wherein the increase in temperature is such that the combustible fluid which has been diluted is brought to a temperature which leads to spontaneous ignition thereof; and
   wherein flow of the combustible fluid open jet is such that at least part of the flue gas is admixed into the combustible fluid open jet through jet-induced recirculation internally within the combustion space; and
   wherein mass flow of the recirculated flue gas corresponds to at least 100% of mass flow in the open jet.

5. A method for combustion of a fuel, in particular in a combustion chamber of a gas turboset, comprising:
   introducing a combustible fluid into a combustion space through at least one entry nozzle to form a combustible fluid open jet, the combustible fluid selected from the group consisting of a fuel and a combustible mixture;
   admixing recirculated flue gas from the combustion space to the combustible fluid open jet in order to dilute the open jet and increase temperature of the open jet;
   wherein the increase in temperature is such that the combustible fluid which has been diluted is brought to a temperature which leads to spontaneous ignition thereof; and
   wherein flow of the combustible fluid open jet is such that at least part of the flue gas is admixed into the combustible fluid open jet through jet-induced recirculation internally within the combustion space; and
   wherein mass flow of the recirculated flue gas corresponds to between 100% and 150% of mass flow in the open jet.

6. A method for combustion of a fuel, in particular in a combustion chamber of a gas turboset, comprising:
   introducing a combustible fluid into a combustion space through at least one entry nozzle to form a combustible fluid open jet, the combustible fluid selected from the group consisting of a fuel and a combustible mixture;
   admixing recirculated flue gas from the combustion space to the combustible fluid open jet in order to dilute the open jet and increase temperature of the open jet;
   wherein the increase in temperature is such that the combustible fluid which has been diluted is brought to a temperature which leads to spontaneous ignition thereof; and
   wherein flow of the combustible fluid open jet is such that at least part of the flue gas is admixed into the combustible fluid open jet through jet-induced recirculation internally within the combustion space; and
   wherein combustible fluid with a first air/fuel ratio is introduced via at least one central first entry nozzle, and combustible fluid with a second air/fuel ratio is introduced via at least one second entry nozzle, the second air/fuel ratio being different than the first air/fuel ratio.

7. The method of claim 6, wherein the air/fuel ratios are altered during operation as a function of operating conditions selected from the group consisting of total burner air/fuel ratio and total combustible fluid mass flow.

8. The method of claim 6, wherein the entirety of fluid jets emerging from the nozzles has an average air/fuel ratio, wherein a premixed combustible mixture with an air/fuel ratio which is less than the average air/fuel ratio is introduced via the first entry nozzle and an oxidizing agent is introduced via at least one further entry nozzle, wherein the oxidizing agent is selected from the group consisting of air and a mixture with an air/fuel ratio which is more than the average air/fuel ratio.

9. The method of claim 6, wherein a premixed fuel-rich combustible mixture with an air/fuel ratio of less than 1 is introduced via the first entry nozzle and an oxidizing agent is introduced via at least one further entry nozzle, wherein the oxidizing agent is selected from the group consisting of air and a low-fuel combustible mixture with an air/fuel ratio of more than 1.

10. The method of claim 9, wherein the premixed fuel-rich combustible mixture has an air/fuel ratio less than 0.6.

11. The method of claim 9, wherein the premixed fuel-rich combustible mixture has an air/fuel ratio less than 0.3.

12. The method of claim 9, wherein the low-fuel combustible mixture has an air/fuel ratio of more than 1.8.

13. The method of claim 9, wherein the low-fuel combustible mixture has an air/fuel ratio of more than 3.

14. The method of claim 6, wherein the entirety of fluid jets emerging from the nozzles has an average air/fuel ratio, wherein an oxidizing agent is introduced via the first entry nozzle and a combustible mixture with an air/fuel ratio which is lower than the average air/fuel ratio is introduced via at least one further entry nozzle, and wherein the oxidizing agent is selected from the group consisting of air and a premixed mixture with an air/fuel ratio which is more than the average air/fuel ratio.

15. The method of claim 6, wherein an oxidizing agent is introduced via the first entry nozzle and a fuel-rich combustible mixture with an air/fuel ratio of less than 1 is introduced via at least one further entry nozzle, wherein the oxidizing agent is selected from the group consisting of air and a premixed low-fuel combustible mixture with an air/fuel ratio of more than 1.

16. The method of claim 15, wherein the premixed low-fuel combustible mixture has an air/fuel ratio of more than 1.8.

17. The method of claim 15, wherein the premixed low-fuel combustible mixture has an air/fuel ratio of more than 3.

18. The method of claim 15, wherein the fuel-rich combustible mixture has an air/fuel ratio of less than 0.6.

19. The method of claim 15, wherein the fuel-rich combustible mixture has an air/fuel ratio of less than 0.3.

20. The method of claim 6, wherein a low-fuel mixture with an air/fuel ratio of more than 1 is introduced via the first entry nozzle and pure oxidizing agent is introduced via at least one further entry nozzle.

21. The method of claim 6, wherein a low-fuel mixture with an air/fuel ratio of more than 1 is introduced via the first entry nozzle and an extremely low-fuel mixture which is no longer combustible is introduced via at least one further entry nozzle.

22. A method for combustion of a fuel, in particular in a combustion chamber of a gas turboset, comprising:
    introducing a combustible fluid into a combustion space through at least one entry nozzle to form a combustible fluid open jet, the combustible fluid selected from the group consisting of a fuel and a combustible mixture;
    admixing recirculated flue gas from the combustion space to the combustible fluid open jet in order to dilute the open jet and increase temperature of the open jet;
    wherein the increase in temperature is such that the combustible fluid which has been diluted is brought to a temperature which leads to spontaneous ignition thereof; and
    wherein flow of the combustible fluid open jet is such that at least part of the flue gas is admixed into the combustible fluid open jet through jet-induced recirculation internally within the combustion space; and
    wherein the combustible fluid fed to at least one entry nozzle is fed in a manner selected from the group consisting of pulsed, cyclical, and oscillating, and wherein at least one discontinuous combustible fluid jet is generated as a result of the manner that the combustible fluid is fed.

23. The method of claim 1, wherein a swirl is imparted to the combustible fluid open jet in at least one entry nozzle.

24. A method for combustion of a fuel, in particular in a combustion chamber of a gas turboset, comprising:
    introducing a combustible fluid into a combustion space through at least one entry nozzle to form a combustible fluid open jet, the combustible fluid selected from the group consisting of a fuel and a combustible mixture;
    admixing recirculated flue gas from the combustion space to the combustible fluid open jet in order to dilute the open jet and increase temperature of the open jet;
    wherein the increase in temperature is such that the combustible fluid which has been diluted is brought to a temperature which leads to spontaneous ignition thereof; and
    wherein flow of the combustible fluid open jet is such that at least part of the flue gas is admixed into the combustible fluid open jet through jet-induced recirculation internally within the combustion space;
    wherein a swirl is imparted to the combustible fluid open jet in at least one entry nozzle; and
    wherein the swirl has a swirl number of less than 0.5.

25. A method for combustion of a fuel, in particular in a combustion chamber of a gas turboset, comprising:
    introducing a combustible fluid into a combustion space through at least one entry nozzle to form a combustible fluid open jet, the combustible fluid selected from the group consisting of a fuel and a combustible mixture;
    admixing recirculated flue gas from the combustion space to the combustible fluid open jet in order to dilute the open jet and increase temperature of the open jet;
    wherein the increase in temperature is such that the combustible fluid which has been diluted is brought to a temperature which leads to spontaneous ignition thereof; and
    wherein flow of the combustible fluid open jet is such that at least part of the flue gas is admixed into the combustible fluid open jet through jet-induced recirculation internally within the combustion space;
    wherein a swirl is imparted to the combustible fluid open jet in at least one entry nozzle; and
    wherein the swirl has a swirl number of less than 0.4.

26. A method for combustion of a fuel, in particular in a combustion chamber of a gas turboset, comprising:
    introducing a combustible fluid into a combustion space through at least one entry nozzle to form a combustible fluid open jet, the combustible fluid selected from the group consisting of a fuel and a combustible mixture;
    admixing recirculated flue gas from the combustion space to the combustible fluid open jet in order to dilute the open jet and increase temperature of the open jet;
    wherein the increase in temperature is such that the combustible fluid which has been diluted is brought to a temperature which leads to spontaneous ignition thereof; and
    wherein flow of the combustible fluid open jet is such that at least part of the flue gas is admixed into the combustible fluid open jet through jet-induced recirculation internally within the combustion space;
    wherein a swirl is imparted to the combustible fluid open jet in at least one entry nozzle; and
    wherein an oppositely directed swirl is imparted to the combustible fluid open jets of at least two entry nozzles arranged adjacent to one another.

27. An apparatus for carrying out the method of claim 1, the apparatus comprising:
    a burner of the combustion chamber of the gas turboset comprising the at least one entry nozzle with a fluid feed connected thereto, a front plate, and at least one opening arranged in the front plate,
    wherein the at least one nozzle is arranged at the at least one opening.

28. An apparatus for carrying out a method for combustion of a fuel, in particular in a combustion chamber of a gas turboset, the method comprising:
    introducing a combustible fluid into a combustion space through at least one entry nozzle to form a combustible fluid open jet, the combustible fluid selected from the group consisting of a fuel and a combustible mixture;

admixing recirculated flue gas from the combustion space to the combustible fluid open jet in order to dilute the open jet and increase temperature of the open jet;

wherein the increase in temperature is such that the combustible fluid which has been diluted is brought to a temperature which leads to spontaneous ignition thereof; and wherein flow of the combustible fluid open jet is such that at least part of the flue gas is admixed into the combustible fluid open jet through jet-induced recirculation internally within the combustion space;

wherein the apparatus comprises:
a burner of the combustion chamber of the gas turboset comprising the at least one entry nozzle with a fluid feed connected thereto, a front plate, and at least one opening arranged in the front plate;

wherein the at least one nozzle is arranged at the at least one opening; and wherein the at least one entry nozzle comprises at least one central first nozzle which is surrounded by a second nozzle arranged so as to run substantially concentrically around the first nozzle.

29. An apparatus for carrying out a method for combustion of a fuel, in particular in a combustion chamber of a gas turboset, the method comprising:

introducing a combustible fluid into a combustion space through at least one entry nozzle to form a combustible fluid open jet, the combustible fluid selected from the group consisting of a fuel and a combustible mixture;

admixing recirculated flue gas from the combustion space to the combustible fluid open jet in order to dilute the open jet and increase temperature of the open jet;

wherein the increase in temperature is such that the combustible fluid which has been diluted is brought to a temperature which leads to spontaneous ignition thereof; and wherein flow of the combustible fluid open jet is such that at least part of the flue gas is admixed into the combustible fluid open jet through jet-induced recirculation internally within the combustion space;

wherein the apparatus comprises:
a burner of the combustion chamber of the gas turboset comprising the at least one entry nozzle with a fluid feed connected thereto, a front plate, and at least one opening arranged in the front plate;

wherein the at least one nozzle is arranged at the at least one opening; and wherein the at least one entry nozzle comprises at least one central first nozzle and a plurality of further nozzles distributed concentrically around the first nozzle.

30. The apparatus of claim 29, wherein the fluid feed to the at least one entry nozzle comprises at least two fluid feeds which can be supplied with fluid independently of one another.

31. The apparatus of claim 30, wherein the at least two fluid feeds each comprise a combustible fluid mixing apparatus for mixing fuel and oxidizing agent, each of the combustible fluid mixing apparatuses independently controllable from one another in such a manner that air/fuel ratio of the combustible fluid fed to each of the nozzles can be set independently of one another.

32. The apparatus of claim 30, further comprising at least one actuator for adjusting mass flow arranged in each of the fluid feeds, the actuators independently controllable from one another in such a manner that the mass flow and exit momentum of an open jet emerging from each of the nozzles can be set independently of one another.

33. The apparatus of claim 27, wherein at least one nozzle comprises a swirl generator.

34. An apparatus for carrying out a method for combustion of a fuel, in particular in a combustion chamber of a gas turboset, the method comprising:

introducing a combustible fluid into a combustion space through at least one entry nozzle to form a combustible fluid open jet, the combustible fluid selected from the group consisting of a fuel and a combustible mixture;

admixing recirculated flue gas from the combustion space to the combustible fluid open jet in order to dilute the open jet and increase temperature of the open jet;

wherein the increase in temperature is such that the combustible fluid which has been diluted is brought to a temperature which leads to spontaneous ignition thereof; and wherein flow of the combustible fluid open jet is such that at least part of the flue gas is admixed into the combustible fluid open jet through jet-induced recirculation internally within the combustion space;

wherein the apparatus comprises:
a burner of the combustion chamber of the gas turboset comprising the at least one entry nozzle with a fluid feed connected thereto, a front plate, and at least one opening arranged in the front plate;

wherein the at least one nozzle is arranged at the at least one opening;

wherein at least one nozzle comprises a swirl generator; and wherein the swirl generator is configured to be variable so as to alter a swirl number which is generated.

35. An apparatus for carrying out a method for combustion of a fuel, in particular in a combustion chamber of a gas turboset, the method comprising:

introducing a combustible fluid into a combustion space through at least one entry nozzle to form a combustible fluid open jet, the combustible fluid selected from the group consisting of a fuel and a combustible mixture;

admixing recirculated flue gas from the combustion space to the combustible fluid open jet in order to dilute the open jet and increase temperature of the open jet;

wherein the increase in temperature is such that the combustible fluid which has been diluted is brought to a temperature which leads to spontaneous ignition thereof; and wherein flow of the combustible fluid open jet is such that at least part of the flue gas is admixed into the combustible fluid open jet through jet-induced recirculation internally within the combustion space;

wherein the apparatus comprises:
a burner of the combustion chamber of the gas turboset comprising the at least one entry nozzle with a fluid feed connected thereto, a front plate, and at least one opening arranged in the front plate;

wherein the at least one nozzle is arranged at the at least one opening; and wherein at least two adjacent nozzles comprise swirl generators for generating swirls in opposite directions.

36. An apparatus for carrying out a method for combustion of a fuel, in particular in a combustion chamber of a gas turboset, the method comprising:

introducing a combustible fluid into a combustion space through at least one entry nozzle to form a combustible fluid open jet, the combustible fluid selected from the group consisting of a fuel and a combustible mixture;

admixing recirculated flue gas from the combustion space to the combustible fluid open jet in order to dilute the open jet and increase temperature of the open jet;

wherein the increase in temperature is such that the combustible fluid which has been diluted is brought to a temperature which leads to spontaneous ignition thereof; and wherein flow of the combustible fluid open jet is such that at least part of the flue gas is admixed into the combustible fluid open jet through jet-induced recirculation internally within the combustion space;

wherein the apparatus comprises:
a burner of the combustion chamber of the gas turboset comprising the at least one entry nozzle with a fluid feed connected thereto, a front plate, and at least one opening arranged in the front plate;
wherein the at least one nozzle is arranged at the at least one opening; and
wherein at least two nozzles comprise different passage cross sections.

37. The apparatus of claim 27, wherein at least one nozzle comprises a non-circular passage cross section.

* * * * *